United States Patent
Dutta et al.

(10) Patent No.: US 9,904,349 B2
(45) Date of Patent: Feb. 27, 2018

(54) TECHNOLOGIES FOR MANAGING POWER OF AN EMBEDDED CONTROLLER DURING A LOW-POWER STATE

(71) Applicant: Intel Corporation, Santa Clara, CA (US)

(72) Inventors: Pronay Dutta, Beaverton, OR (US); Krishna Kumar Ganesan, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 196 days.

(21) Appl. No.: 14/671,721

(22) Filed: Mar. 27, 2015

(65) Prior Publication Data
US 2016/0282929 A1    Sep. 29, 2016

(51) Int. Cl.
G06F 1/00    (2006.01)
G06F 1/32    (2006.01)
G06F 9/44    (2018.01)

(52) U.S. Cl.
CPC .......... *G06F 1/3287* (2013.01); *G06F 1/3206* (2013.01); *G06F 1/3209* (2013.01); *G06F 9/4418* (2013.01); *Y02B 60/1282* (2013.01); *Y02B 60/186* (2013.01); *Y02B 60/32* (2013.01)

(58) Field of Classification Search
CPC .... G06F 1/3203; G06F 1/3287; G06F 1/3206; G06F 1/329; G06F 1/3243; G06F 9/4418; G06F 1/3293; G06F 1/3212
See application file for complete search history.

(56) References Cited

U.S. PATENT DOCUMENTS

| | | | |
|---|---|---|---|
| 8,856,566 B1 | 10/2014 | Jane | |
| 2004/0151149 A1* | 8/2004 | Song | G06F 1/3209 370/338 |
| 2010/0153765 A1* | 6/2010 | Stemen | G06F 1/3203 713/340 |
| 2013/0067256 A1* | 3/2013 | Shiraishi | G01R 31/3606 713/320 |
| 2014/0010132 A1 | 1/2014 | Ma | |
| 2014/0344599 A1 | 11/2014 | Branover et al. | |

(Continued)

FOREIGN PATENT DOCUMENTS

WO    2014-105203    7/2014

OTHER PUBLICATIONS

Microsoft SQL Server, published Mar. 2014, [online], [retrieved on Feb. 1, 2015], retrieved from the Internet, URL: https://msdn.microsoft.com/en-us/library/dn632678.aspx, 9 pages.

(Continued)

*Primary Examiner* — Xuxing Chen
(74) *Attorney, Agent, or Firm* — Barnes & Thornburg LLP

(57) ABSTRACT

Technologies for managing the power usage of components of a computing device, while the components and the computing device are in a low-power state, such as a connected standby state. An embedded controller includes a wake-up timer designed to wake up the embedded controller during a low-power state to allow the embedded controller to perform its tasks. A power control system is configured to dynamically alter the timing cycle of the wake-up timer of the embodied controller based on operation data received. The dynamically altered timing cycle is designed to conserve power, but maintain functionality of the embedded controller.

25 Claims, 5 Drawing Sheets

(56) References Cited

U.S. PATENT DOCUMENTS

2014/0359326 A1* 12/2014 Tsao .................. G06F 1/3243
                                                         713/320
2015/0026491 A1*  1/2015 Park .................. H04L 12/12
                                                         713/310
2015/0074435 A1   3/2015 Jane et al.
2015/0323984 A1* 11/2015 Ganton ................ G06F 1/28
                                                         713/323

OTHER PUBLICATIONS

Platform design for connected standby, [online], [retrieved on Feb. 1, 2015], retrieved from the internet, URL: https://msdn.microsoft.com/en-us/library/windows/hardware/dn481228(v=vs.85).aspx, 2 pages.

International Search Report for PCT/US16/019587, dated Jun. 15, 2016 (3 pages).

Written Opinion for PCT/US16/019587, dated Jun. 15, 2016 (9 pages).

* cited by examiner

TECHNOLOGIES FOR MANAGING POWER OF AN EMBEDDED CONTROLLER DURING A LOW-POWER STATE

BACKGROUND

Many computing systems include one or more low-power states, and one of those low-power modes may include a connected standby mode. Connected standby is a low-power state that features low power consumption while maintaining internet connectivity. The connected standby state allows programs and applications to conserve power and update automatically. Another benefit of connected standby is that computing devices can resume normal operations from a connected standby state quickly. Typical computing devices may include hardware, firmware, and/or software to manage power consumption during a connected standby state.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

Figure 1:
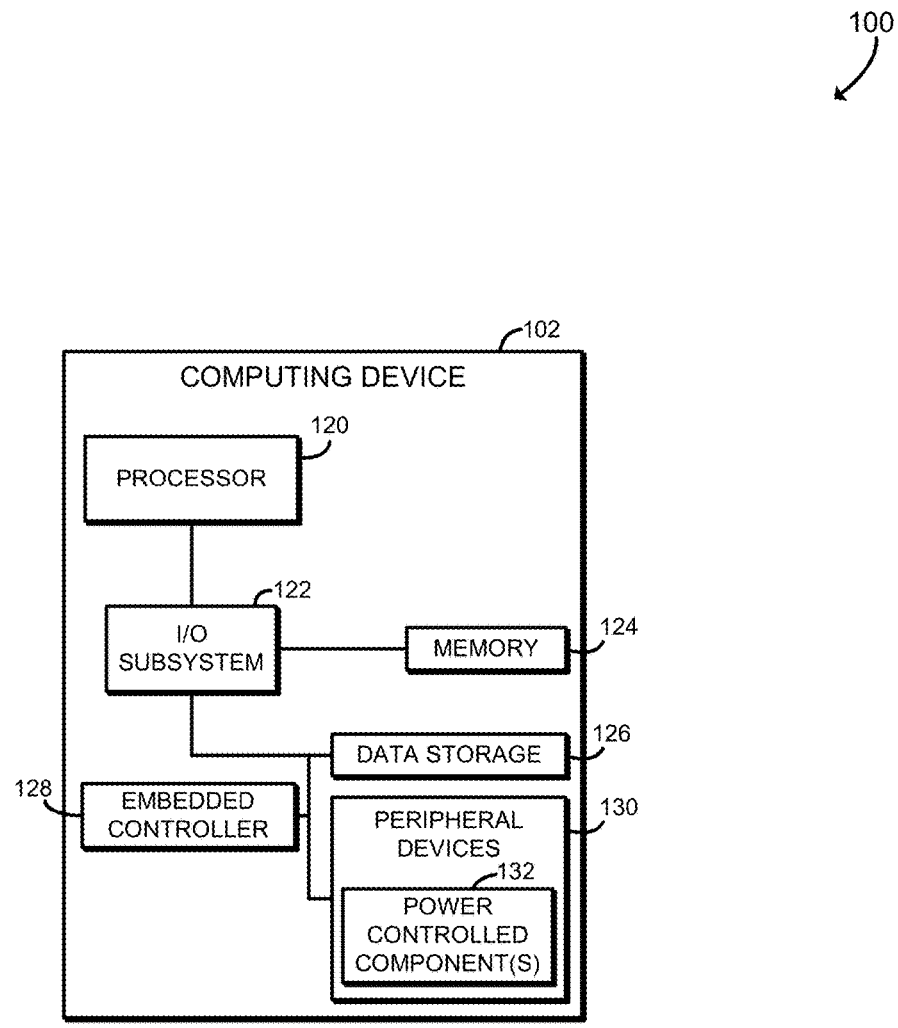
FIG. 1 is a simplified block diagram of at least one embodiment of a computing device capable of implementing a connected standby state.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on a transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIG. 1, a computing device 102 configured to dynamically adjust, during a connected standby state or when preparing to enter the connected standby state, a timing cycle of an embedded controller 128 included in the computing device 102. In use, as discussed in more detail below, the computing device 102 is configured to manage the power consumption of one or more power controlled devices while the computing device 102 is in a connected standby state to conserve power. For example, quickly pressing and releasing the power button on many smartphones may cause the smartphone to enter a connected standby state, where the screen and other components of the smartphone enter a low-power mode. However, in the connected standby state, the components and applications stored on the smartphone maintain internet connectivity. For example, email applications on a smartphone may still receive and alert a user about new emails, even though the screen, and other components, of the smartphone are in a low-power mode.

When the computing device 102 enters connected standby, the embedded controller 128 is also put in a low-power state. In general, when in the low-power state, the embedded controller 128 sets a wake-up timer to a constant timing cycle (e.g., wake-up every one second). The wake-up timer is configured to wake up the embedded controller 128 according to the timing cycle so that the embedded controller 128 can perform tasks. The wake-up timer and the timing cycle allows the embedded controller 128 to conserve energy while still performing some of its functions (e.g., fan control and thermal management of the computing device 102). When the computing device 102 is in connected standby, the regular and frequent default timing cycle of the embedded controller 128 may consume more power than is necessary. For example, in many computing devices the embedded controller is configured to monitor thermal events of the CPU; however, when the computing device 102 is in connected standby, the CPU of the computing device 102 may not experience many thermal events that require action by the embedded controller 128. The computing device 102, through hardware, firmware, and/or software, may be configured to dynamically adjust the embedded controller's wake-up timer to further conserve power when the computing device 102 is in a connected standby state. The wake-up timer of the embedded controller 128 may be implemented using hardware, firmware, software, or any combination thereof.

The computing device 102 may be embodied as any type of computation or computer device capable of performing the functions described herein, including, without limitation, a computer, a multiprocessor system, a server, a rack-mounted server, a blade server, a laptop computer, a notebook computer, a network appliance, a web appliance, a distributed computing system, a processor-based system, and/or a consumer electronic device. As shown in FIG. 1, the illustrative computing device 102 includes a processor 120, an input/output (I/O) subsystem 122, a memory 124, data storage 126, an embedded controller 128, and peripheral devices 130. Of course, the computing device 102 may include other or additional components, such as those commonly found in a computing device (e.g., various input/output devices), in other embodiments. Additionally, in some embodiments, one or more of the illustrative components may be incorporated in, or otherwise form a portion of, another component. For example, the memory 124, or portions thereof, may be incorporated in the processor 120 in some embodiments.

The processor 120 may be embodied as any type of processor capable of performing the functions described herein. For example, the processor 120 may be embodied as a single or multi-core processor(s), digital signal processor, microcontroller, or other processor or processing/controlling circuit. Similarly, the memory 124 may be embodied as any type of volatile or non-volatile memory or data storage capable of performing the functions described herein. In operation, the memory 124 may store various data and software used during operation of the computing device 102 such operating systems, applications, programs, libraries, and drivers. The memory 124 is communicatively coupled to the processor 120 via the I/O subsystem 122, which may be embodied as circuitry and/or components to facilitate input/output operations with the processor 120, the memory 124, and other components of the computing device 102. For example, the I/O subsystem 122 may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations. In some embodiments, the I/O subsystem 122 may form a portion of a system-on-a-chip (SoC) and be incorporated, along with the processor 120, the memory 124, and other components of the computing device 102, on a single integrated circuit chip.

The data storage device 126 may be embodied as any type of device or devices configured for short-term or long-term storage of data such as, for example, memory devices and circuits, memory cards, hard disk drives, solid-state drives, or other data storage devices. The data storage device 126 may store compressed and/or decompressed data processed by the computing device 102.

The computing device 102 also includes an embedded controller 128, which may be embodied as a microcontroller or any other circuit, device, firmware, software, or collection thereof, capable of performing various tasks of the computing device 102 not handled by the main processor 120. The embedded controller 128 may include various devices and sub-circuit to facilitate the functionality of the embodied controller. For example, in some embodiments, the embedded controller 128 may include its own RAM to be used while performing tasks. The particular tasks performed by the embedded controller 128 may be dependent on the type of computing device 102, the present operation state of the computing device 102, and/or other criteria. For example, in some embodiments, the embedded controller 128 may be tasked with receiving and processing signals for various buttons and switches (e.g., the keyboard), thermal measurement of the processor 120 (including accompanying fan control, CPU throttling, and emergency shutdown in response to rising temperatures), controlling indicator lights, monitoring and managing power stored in the battery (including managing the battery charger), controlling the watchdog timer, or other functions as needed.

The peripheral device(s) 130 of the computing device 102 may include any number of additional input/output devices or interface devices. In the illustrative embodiment, the peripheral devices 130 include power controlled components 132. Each power controlled component 132 may be embodied as any electrical component, device, or circuit that is capable of entering a low-power state, including a connected standby state. Examples of power controlled components include, without limitation, data storage devices, communication circuits and devices, sensors, secure digital card readers, and/or any other components capable of entering a low-power state. Of course, the computing device 102 may include additional or other peripheral devices as might be necessary to perform the functions of the computing device 102, such as, for example, a communication device, displays, keyboards, and other input/output devices.

Figure 2:
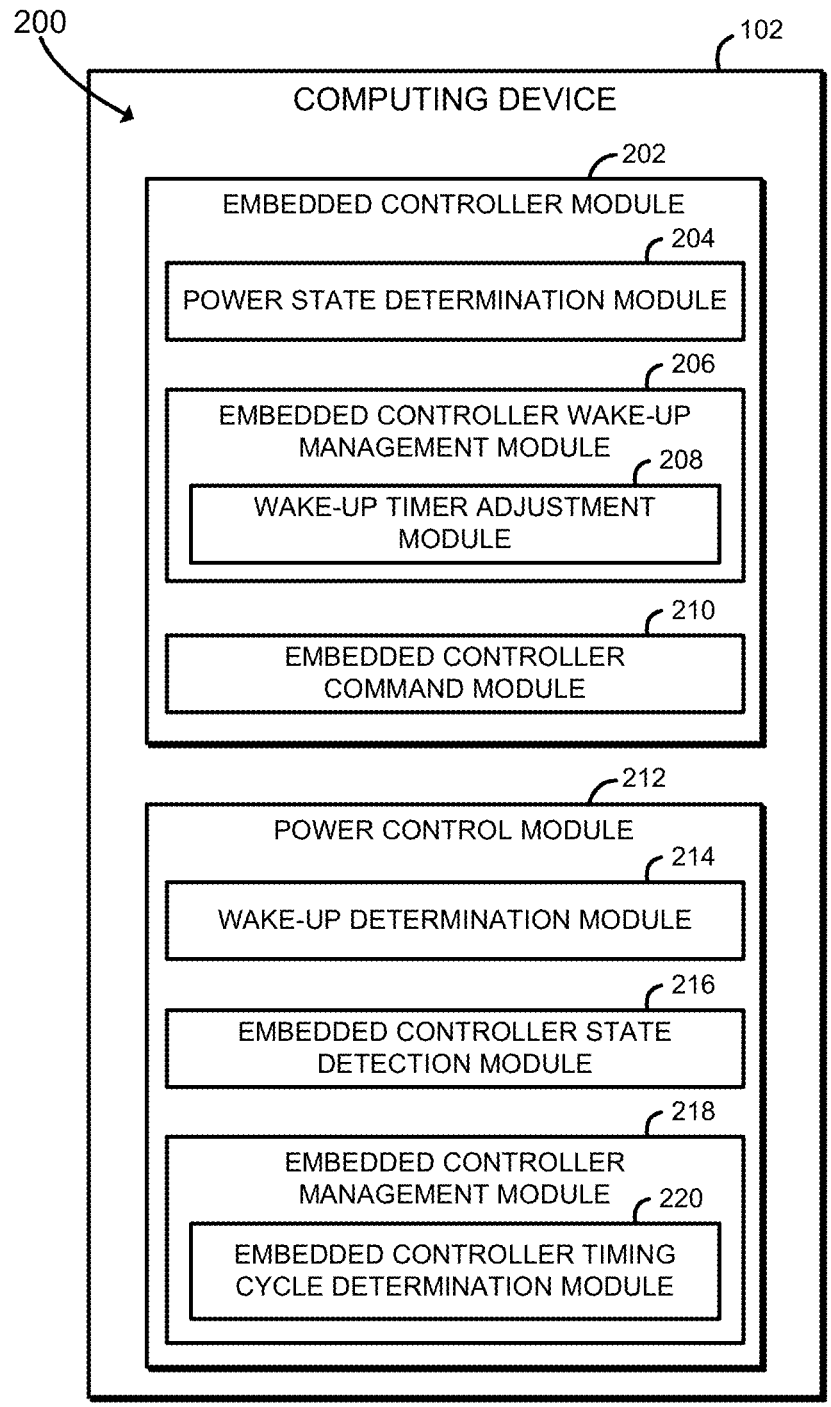
FIG. 2 is a simplified block diagram of at least one embodiment of an environment that may be established by the computing device of FIG. 1 during a connected standby state.

Referring now to FIG. 2, in an illustrative embodiment, the computing device 102 establishes an environment 200 during operation. The illustrative embodiment 200 comprises an embedded controller module 202 and a power control module 212. The various modules of the environment 200 may be embodied as hardware, firmware, software, or a combination thereof. For example, the various modules, logic, and other components of the environment 200 may form a portion of, or otherwise be established by, the processor 120, the embedded controller 128, or other hardware components of the computing device 102. As such, in some embodiments, any one or more of the modules of the environment 200 may be embodied as a circuit or collection of electrical devices (e.g., an embedded controller circuit, a power control circuit, etc.).

The embedded controller module 202 is configured to perform the functions of the embedded controller 128, including control the embedded controller 128 during a low-power state and during an active state. The embedded controller module 202 may be established by the embedded controller 128 and illustratively includes a power state determination module 204, a wake-up management module 206, and a command module 210.

The power state determination module 204 is configured to determine the current power state of the computing device 102 and the current power state of the embedded controller 128. The power state determination module 204 may use sensors to determine which power state the computing device 102 currently is in or otherwise monitor for signals received from the computing device 102 regarding the computing device's power state. For example, if the computing device 102 is about to enter the connected standby state, the computing device 102 may send a signal to the embedded controller 128 to enter a low-power state as part of the overall connected standby state, which may be detected by the power state determination module. Once the power state determination module 204 detects that the embedded controller 128 is in a low-power state, the power state determination module informs the wake-up management module 206.

The wake-up management module 206 is configured to control the timing cycle of the embedded controller 128 while the embedded controller 128 is in a low-power state. To conserve power while in a low-power state, the embedded controller 128 sets a wake-up timer to periodically power-up the embedded controller 128 to perform its assigned tasks. In some embodiments, the wake-up timer is set to a default timing cycle to wake-up the embedded controller 128 on a regular basis (e.g., every one second). When the embedded controller 128 is woken-up, the embedded controller 128 performs its assigned tasks, such as, for example measuring the temperature of the processor of the computing device 102 and determining if the temperature of the processor is above a certain threshold. The wake-up management module 206 may include a timing cycle adjustment module 208 to determine a timing cycle or wake-up period of the embedded controller 128 (i.e., how frequently the embedded controller 128 should be woken-up while in the low-power state). The timing cycle/wake-up period of the embedded controller 128 refers to how frequently the embedded controller 128 wakes-up while in the low-power state. For example, the timing cycle may require the embedded controller 128 to wake up every one second, while at other times the timing cycle may require the embedded controller 128 to wake up every fifteen seconds. The timing cycle adjustment module 208 is configured to receive timing cycle data and adjust the timing cycle of the embedded controller 128 based on the timing cycle data. In some embodiments, the timing cycle data may include information related to the tasks that the embedded controller 128 performs in the computing device 102, such as, for example, thermal measurement data related to the temperature of the processor or battery life data related to the amount of available power stored in a battery of the computing device 102.

The embedded controller command module 210 is configured to perform the tasks required of the embedded controller 128. As discussed above, when the embedded controller is fully powered, or in an active state, the embedded controller 128 performs a number of tasks for computing device 102, such as monitoring thermal events of the processor 120 and battery life of the computing device 102. After the wake-up management module 206 has woken up the embedded controller 128, the command module 210 executes the tasks required of the embedded controller 128.

The power control module 212 is configured to manage the power consumption of the power controlled components 132 of the computing device 102 while the computing device 102 is in the connected standby state and/or preparing to enter the connected standby state. In some embodiments, the power control module 212, or a portion thereof, may be embodied as firmware, software, or a combination thereof executed by an operating system of the computing device 102. For example, a portion of the power control module 212 may be embodied as a Microsoft Window's power engine plugin in some embodiments. Regardless, the illustrative power control module 212 includes a wake-up determination module 214, an embedded controller state detection module 216, and an embedded controller management module 218.

The wake-up determination module 214 is configured to periodically wake-up certain components of the computing device 102, while the computing device 102 is in the connected standby state. When the computing device 102 enters the connected standby state, many of the power controlled components 132 enter a low-power mode to conserve energy. As part of entering most low-power modes, the power controlled components 132 can no longer perform certain functions, such as, for example, connect to an external network and check for updates. To maintain functionality while conserving power in the connected standby state, the power control module 212 periodically wakes up the power controlled components 132 according to a wake-up cycle of the power control module 212. For example, the wake-up cycle of the power control module 212 may require that the power controlled components 132 wake up every thirty seconds, connect to the internet, and check for updates. In some embodiments, the power controlled components 132 perform a variety of functions, besides connecting to the internet, after being woken-up by power control module 212. The wake-up determination module 214 determines a wake-up cycle that causes all power controlled components 132 controlled by the power control module 212 to wake up at regular intervals. In some embodiments, the wake-up cycle wakes all power controlled components 132 at once, while in other embodiments, the power controlled components may be woken-up in a staggered pattern to prevent energy surges. In general, the wake-up cycle of the power control module 212 is a predetermined period of time after which all the power controlled components 132 are woken up, for example, the wake-up cycle may require that every thirty seconds all components are woken-up by the power control module 212. In some embodiments, the wake-up determination module 214 causes the power controlled components 132 to wake-up by transmitting a wake-up command to all of the power controlled components 132 being managed by the power control module 212.

The embedded controller state detection module 216 is configured to detect whether the embedded controller 128 is in a low-power state. If the computing device 102 is in the connected standby state and the embedded controller 128 is in a low-power state, the power control module 212 may include the embedded controller 128 in the list of power controlled components 132 managed by the power control module 212. Since the embedded controller 128 performs tasks that may be deemed critical for the proper functioning of the computing device 102, the embedded controller 128 may be required to wake up more frequently than other power controlled components 132.

The embedded controller management module 218 is configured to dynamically manage the timing cycle of the embedded controller 128 while it is in the low-power state. If an embedded controller 128 uses a static predetermined timing cycle to wake-up and perform tasks during a low-power state, the embedded controller 128 may be waking up more than is necessary. Often, designers may choose a default timing cycle such that the embedded controller 128 wakes up more often than is required to prevent damage to the computing device 102. To alleviate such unnecessary wake ups, the embedded controller management module 218 receives operation data from the embedded controller 128 and uses the operation data to determine a new timing cycle of the embedded controller 128. Operation data may include any information related to the embedded controller 128 or the tasks that the embedded controller 128 is required to perform. For example, operation data may include thermal data of the processor 120 measured by the embedded controller 128. Based on the thermal data and other received operation data, the embedded controller management module 218 determines new timing cycle data for the embedded controller 128. The new timing cycle data is used to set the wake-up timer of the embedded controller 128.

The embedded controller management module 218 includes an embedded controller timing cycle determination module 220 that is configured to determine a new timing cycle for the embedded controller 128. For example, the embedded controller timing cycle determination module 220 may generate timing cycle data, which includes instructions that the embedded controller 128 is to wake up every five seconds and perform tasks.

In some embodiments, the embedded controller management module 218 determines new timing cycles for the embedded controller 128 only during a wake-up cycle of the power control module 212. In between wake-up cycles of the power control module 212, the embedded controller 128 is capable of waking up and performing tasks without transmitting operation data to the power control module 212. For example, during a wake-up cycle of the power control module 212, the embedded controller management module 218 will receive operation data from the embedded controller 128, determine new timing cycle data based on the operation data, and transmit the new timing cycle data to the embedded controller 128. Between wake-up cycles of the power control module 212, the embedded controller 128 will wake-up according to its timing cycle and perform tasks. At the next wake-up cycle of the power control module 212, the embedded controller management module 218 will again determine new timing data for the embedded controller 128. In some embodiments, the embedded controller 128 performs its tasks every wake-up cycle of the power control module 212.

Figure 3:
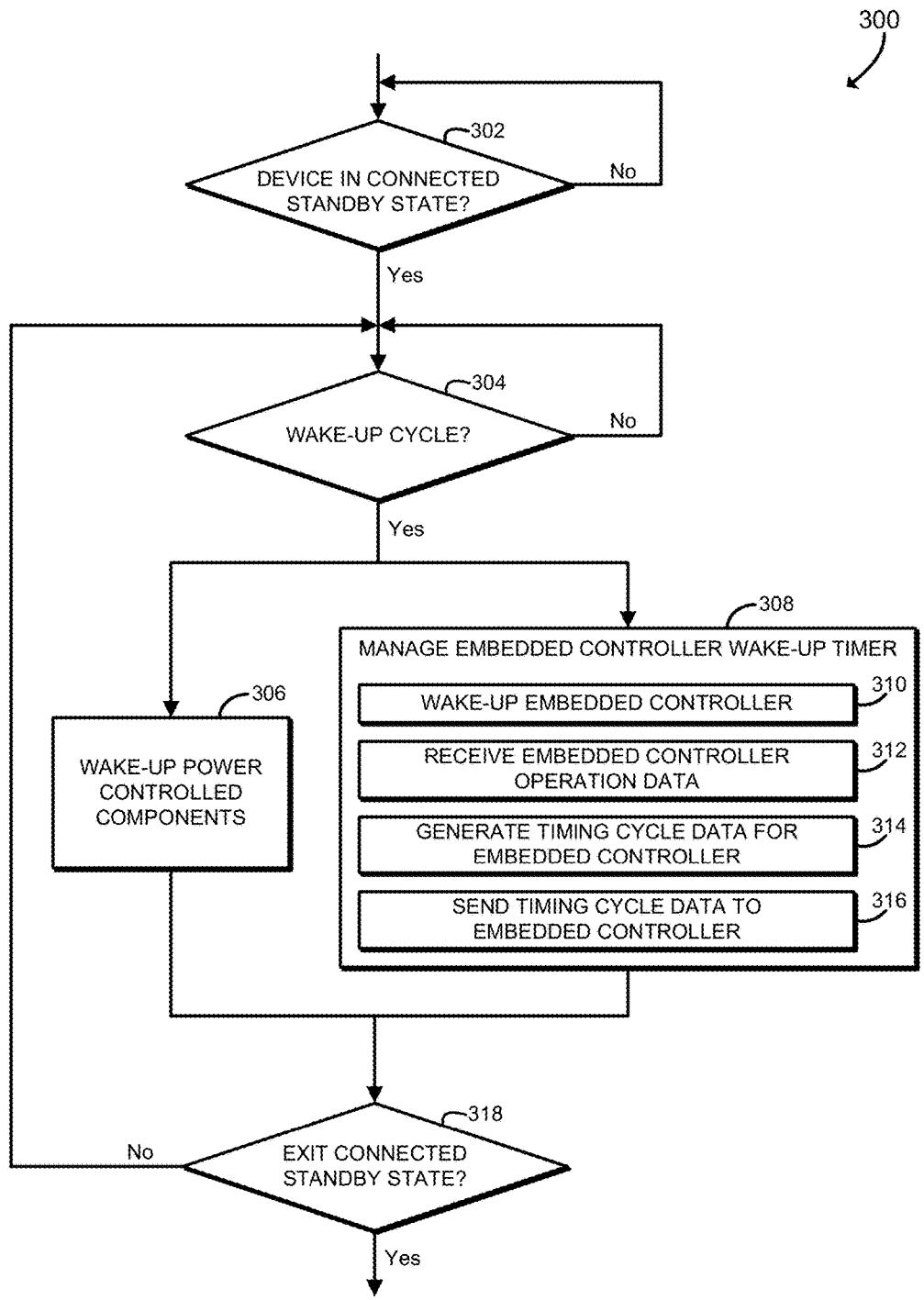
FIG. 3 is a simplified flow diagram of at least one embodiment of a method implemented by the computing device of FIG. 1 for dynamically adjusting the timing cycle of an embedded controller.

Referring to FIG. 3, in use, the computing device 102 may execute a method 300 for managing power of the components of the computing device 102 during a connected standby state and/or while preparing to enter the connected standby state. In an illustrative embodiment, the method 300 is executed by the power control module 212. At block 302, the power control module 212 monitors the computing device 102 and determines whether the computing device 102 is in a connected standby state. If the computing device 102 is not in a connected standby state, the method 300 will continue to monitor the state of the computing device 102. If the computing device 102 is in the connected standby state, the power control module 212 determines whether it is time to wake up the power controlled components 132 based on a wake-up cycle of the power control module 212. Once a wake-up cycle is initiated, at block 306, the power control module 212 wakes up all of the power controlled components 132 being controlled by the power control module 212.

At block 308, the power control module 212, wakes up and manages the embedded controller 128, including managing the wake-up timer of the embedded controller. At block 310, the embedded controller 128 is woken up by the power control module 212. Once energized, the embedded controller 128 determines embedded controller operation data, such as, for example, the battery-life of the battery and the temperature of the processor, and transmits the operation data to the power control module 212. At block 312, the power control module 212 receives the embedded controller operation data. At block 314, the power control module 212 generates timing cycle data based on the operation data received from the embedded controller 128. For example, if the operation data indicates that the processor is operating at a temperature within the normal operating parameters of the processor 120, the timing cycle data may indicate that the embedded controller 128 should wake up every fifteen seconds to perform its tasks. However, if the operation data indicates that the processor 120 is operating at an elevated temperature, the timing cycle data may indicate that the embedded controller 128 should wake up more frequency, such as every five seconds, to ensure that the temperature of the processor 120 does not exceed the processor's parameters. In some embodiments, the timing cycle data is determined by balancing operation data concerning all of the tasks the embedded controller 128 performs. For example, the operation data may include information about the operating temperature of the processor 120, the power available in the battery of the computing device 102, signals received from input/output devices (e.g., keyboards and other buttons), signals received from the power button of the computing device 102, or other information related to the tasks of the embedded controller 128.

At block 316, the power control module 212 sends the timing cycle data to the embedded controller 128. The embedded controller 128 then uses the timing cycle data to set its own timing cycle by setting its wake-up timer. At block 318, the power control module 212 determines whether the computing device 102 has exited the connected standby state. If the computing device 102 has not exited the connected standby state, the power control module 212 loops back to block 304 and waits until it is time to initiate the next wake-up cycle.

Figure 4:
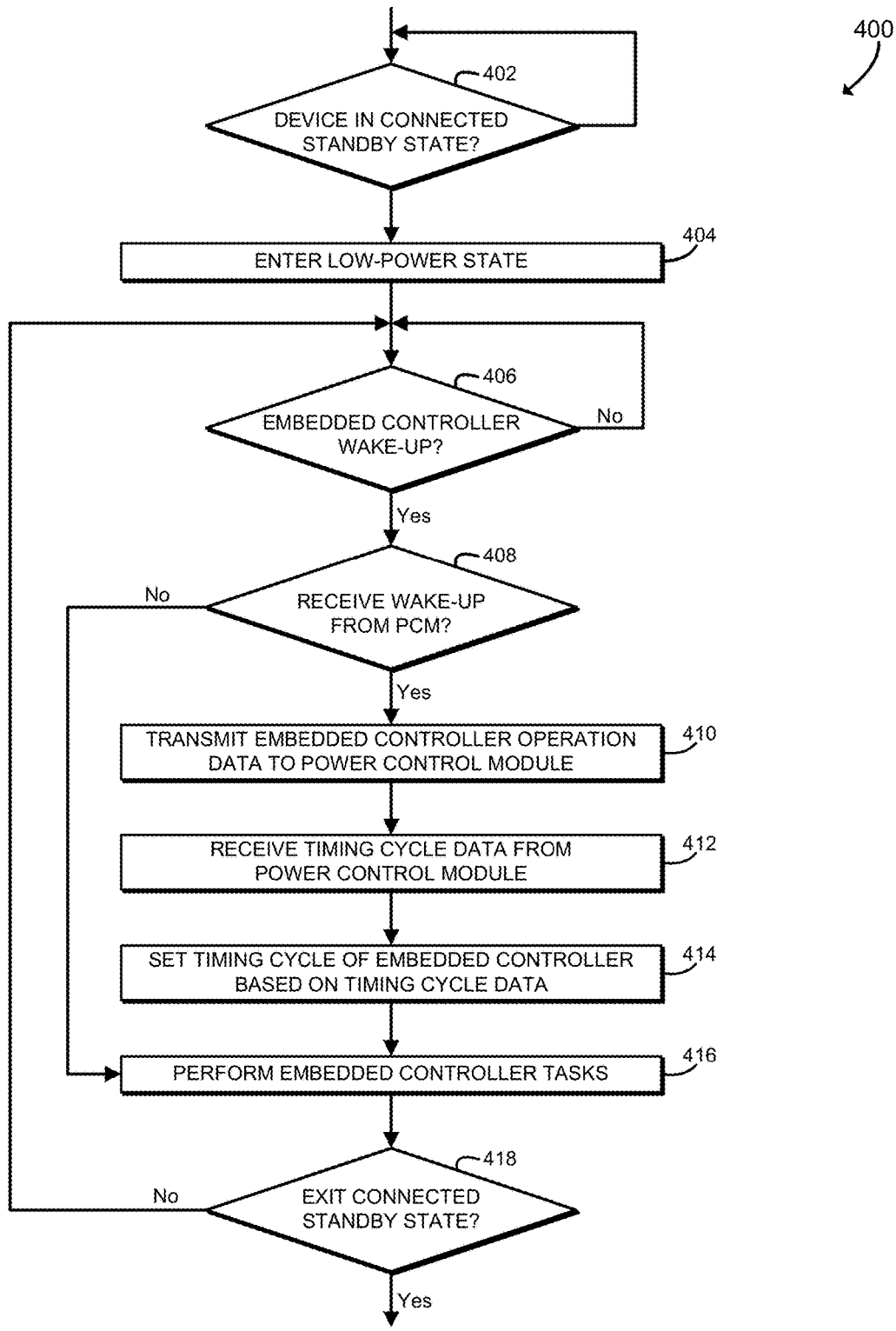
FIG. 4 is a simplified flow diagram of at least one embodiment of a method implemented by the embedded controller of FIG. 1 for dynamically adjusting the timing cycle of the embedded controller.

Referring to FIG. 4, in use, the computing device 102 may execute a method 400 for managing power of the embedded controller 128 during a low-power state. In an illustrative embodiment, the method 400 is executed by the embedded controller 128. At block 402, the embedded controller 128 continuously monitors the computing device 102 until it determines that the computing device 102 is in a connected standby state or preparing to enter a connected standby state. Once the computing device 102 enters the connected standby state, at block 404, the embedded controller 128 enters a low-power state. In general, the low-power state of the embedded controller 128 involves powering down the most of the embedded controller 128 and setting a wake-up timer to wake up the embedded controller 128 periodically.

At block 406, the embedded controller 128 waits until either the wake-up timer of the embedded controller 128 or the power control module 212 indicates that the embedded controller 128 is to be energized. At block 408, the embedded controller 128 determines whether the command to wake-up came from the power control module 212 or the wake-up timer of the embedded controller 128. If the wake-up was initiated by the wake-up timer, the embedded controller 128 goes to block 416 and performs the tasks assigned to the embedded controller 128. If the wake-up was initiated by the power control module 212 in response to a wake-up cycle of all power controlled components 132, the embedded controller 128 begins the process of obtaining new timing cycle data.

At block 410, the embedded controller 128 obtains and transmits embedded controller operation data to the power control module 212. For example, the operation data may include information about the operating temperature of the processor 120, the power available in the battery of the computing device 102, signals received from input/output devices (e.g., keyboards and other buttons), signals received from the power button of the computing device 102, or other information related to the tasks of the embedded controller 128. At block 412, the embedded controller 128 receives timing cycle data from the power control module 212. The timing cycle data is based on the operation data sent to the power control module 212, and includes a new timing cycle for the embedded controller 128 to use until the next wake-up cycle of the power control module 212. At block 414, the embedded controller 128 sets its timing cycle based on the timing cycle data received. For example, the old timing cycle may require that the embedded controller 128 be woken up every one second, but the new timing cycle may require that the embedded controller 128 be woken up every five seconds because the processor is operating at a cooler temperature.

At block 416, the embedded controller 128 performs its tasks, such as, for example, fan control and thermal event monitoring, monitoring of battery life, monitoring of input/output commands, or other tasks. At block 418, the embedded controller 128 determines whether the computing device 102 has exited the connected standby state. If the computing device 102 has not exited the connected standby state, the embedded controller 128 continues to monitor for wake-up signals from either the power control module 212 or the wake-up timer of the embedded controller 128.

Figure 5:
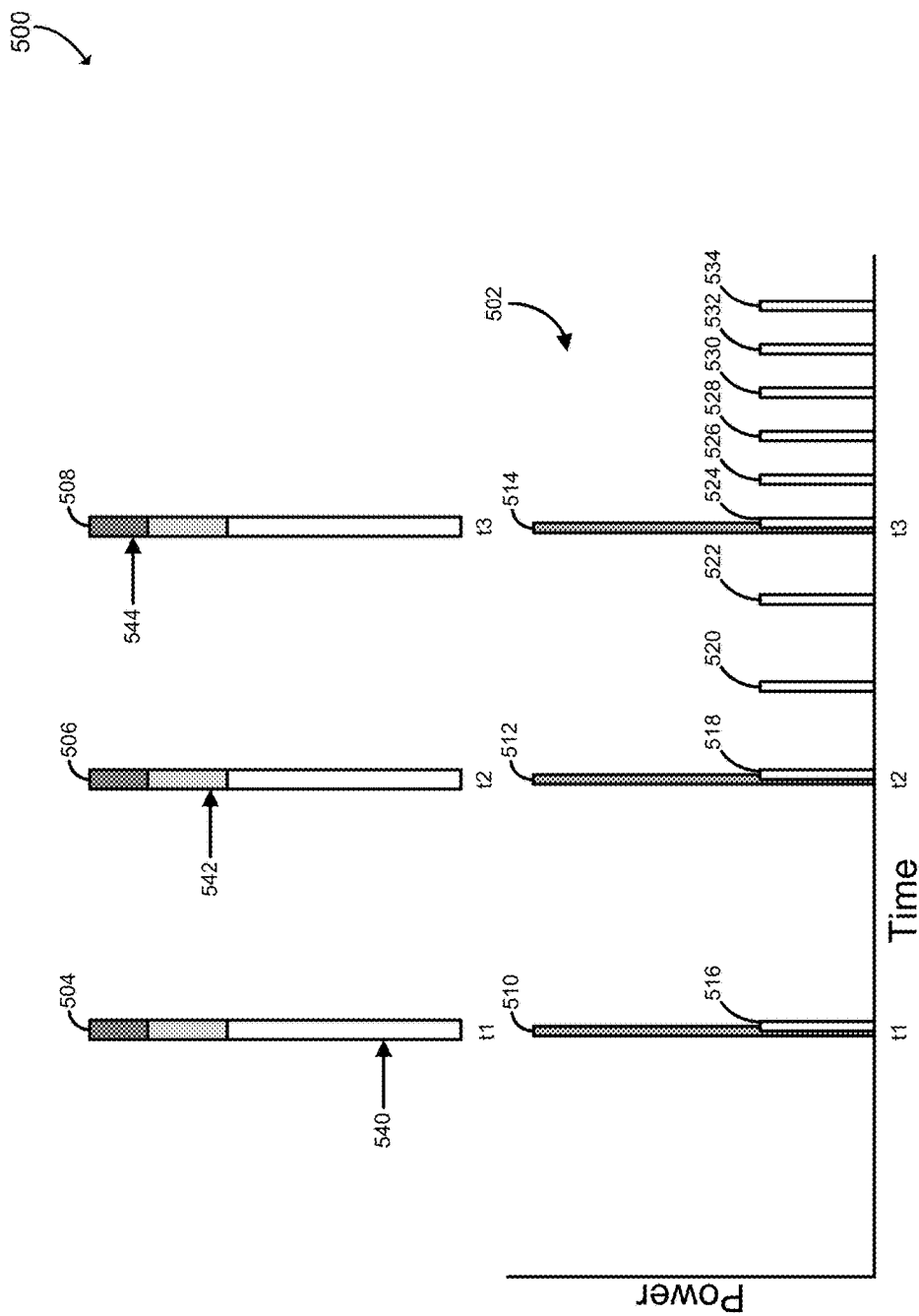
FIG. 5 is a simplified graph of at least one embodiment of power output data of the computing device during a connected standby state.

Referring to FIG. 5, an embodiment 500 of power output data of the computing device 102 in the connected standby state is shown. Elements 504, 506, 508 show operation data collected by the embedded controller 128 and used by the power control module 212 to determine timing cycle data. In an illustrative embodiment, a graph 502 represents the power usage of the computing device 102 during a connected standby state. The grey bars 510, 512, 514 at times t1, t2, and t3 represent wake-up cycles of the power control module 212, where the power control module 212 wakes up all power controlled components 132. The white bars, 516, 518, 520, 522, 524, 526, 528, 530, 532, 534 represent timing cycles of the embedded controller 128, or times when the embedded controller is woken up by either the wake-up timer or the power control module 212. In the illustrative embodiment, the white bars 516, 518, 524 at times t1, t2, and 53 are represented separately from the grey bars 510, 512, 514 to better show that the embedded controller 128 uses power during a wake-up cycle of the power control module 212. It will be appreciated that in practice, the power usage of the embedded controller 128 represented by white bars 516, 518, 524 is already incorporated into the grey bars 510, 512, 514. White bars 516, 518, 524 are shown only for illustrative purposes.

In an illustrative embodiment, the elements 504, 506, 508 depict a range of possible thermal temperatures of the processor 120, where the bottom of the elements 504, 506, 508 represents cooler temperatures and the top of the elements 504, 506, 508 represent higher temperatures. Each element 504, 506, 508 is broken up into three separate regions merely to illustrate that different measured temperatures of the processor 120 result in different timing cycles of the embedded controller 128. Arrows 540, 542, 544 depict the temperature of the processor 120 measured by the embedded controller 128 during the wake-up cycles of the power control module 212 at t1, t2, and t3. FIG. 5 depicts the temperature of the processor 120 as the only operation data used by the power control module 212 to determine a timing cycle of the embedded controller 128 by way of example only. In some embodiments, many types of operation data may be used to determine the timing cycle of the embedded controller 128.

In operation, when the power control module 212 causes all of the power controlled components 132 to be woken up at time t1 (the total power consumed in this wake-up cycle is represented by grey bar 510), the embedded controller 128 measures the temperature of the processor 120. Element 504 represents the range of possible temperatures of the processor 120 at time t1, and the arrow 540 represents the temperature measured by the embedded controller at t1. The regions of element 504 show that the temperature represented by arrow 540 is well within the operating parameters of the processor 120. The power control module 212 uses the operation data represented by arrow 540 to determine timing cycle data, which data will be used by the embedded controller 128 to set a timing cycle. As is shown in graph 502, based on the temperature represented by arrow 540, the timing cycle of embedded controller 128 does not cause the embedded controller 128 to wake up until the next overall wake-up cycle represented by grey bar 512. In the example illustrated in FIG. 5, the timing cycle of the embedded controller 128 between time t1 and time t2 is equal in length to the wake-up cycle because the temperature measured by the embedded controller 128 is well within the safe operating parameters of the processor 120.

At time t2, the power control module 212 again initiates a wake-up of all power controlled components 132 (the total power consumed in this wake-up cycle is represented by grey bar 512). Upon being woken up, the embedded controller 128 measures the temperature of the processor 120. The measured temperature of processor 120 at time t2 is represented by arrow 542 and element 506. Arrow 542 shows that the temperature of the processor 120 has risen and that the temperature may be of some concern. To ensure that the processor does not overheat, the power control module 212 generates a timing cycle for the embedded controller 128 that causes the embedded controller 128 to wake-up and perform tasks more frequently than the previous timing cycle. The new timing cycle of the embedded controller 128 is represented by white bars 520, 522. The new timing cycle of embedded controller 128 causes the wake-up timer to wake-up the embedded controller 128 twice between overall wake-up cycles. The more frequent timing cycle of the embedded controller 128 is done to protect the computing device 102 from damage. The total power consumed by each of the individual embedded controller wake-ups is represented by the height of the white bars 520, 522.

At time t3, the power control module 212 again initiates a wake-up of all power controlled components 132 (the total power consumed in this wake-up cycle is represented by grey bar 514). Again, the embedded controller 128 collects operation data by measuring the temperature of the processor 120 and sends that operation data to the power control module 212. The temperature of the processor 120 is measured at time t3 is represented by arrow 544, and shows that the temperature of the processor 120 may be rising to dangerously high levels. Upon receiving the temperature represented by arrow 544, the power control module 212 generates a new timing cycle of the embedded controller 128 represented by white bars 526, 528, 530, 532, 534. The period between embedded controller 128 wake-ups of the new timing cycle is much shorter than the previous two illustrated timing cycles because of the differences in the operation data received by the power control module 212, i.e., the temperature of the processor 120 is higher.

In some embodiments, if the embedded controller 128 determines that action needs to be taken to protect the computing device 102 from damage (e.g., the temperature of the processor 120 has exceeded normal operating parameters), the embedded controller 128 can cause the computing device 102 to exit the connected standby state and to take preventive measures. For example, the embedded controller 128 may communicate with the power control module 212 to wake up the computing device 102 such that the action can be taken. Additionally or alternatively, the embedded controller 128 may communicate with the power control module 212 to adjust the wakeup timing cycle of other components of the computing device 102 (or the computing device 102 itself). As is shown by the embodiment 500, the computing device 102 can dynamically adjust the timing cycle used by the embedded controller 128 during a connected standby state to conserve power and to maintain the critical functionality of the embedded controller.

EXAMPLES

Illustrative examples of the technologies disclosed herein are provided below. An embodiment of the technologies may include any one or more, and any combination of, the examples described below.

Example 1 includes a computing device for managing power during a connected standby state, the computing device comprising one or more electrical components to enter a low-power state; an embedded controller to perform one or more tasks of the computing device; and a power control module to determine whether the computing device is in a connected standby state, initiate a wake-up cycle to periodically wake-up the one or more electrical components of the computing device in response to a determination that the computing device is in the connected standby state, wake-up the embedded controller to allow the embedded controller to perform the one or more tasks, receive, in response to the wake-up of the embedded controller, operation data from the embedded controller related to the one or more tasks to be performed by the embedded controller, generate timing cycle data for the embedded controller, wherein the timing cycle data defines a wake-up period for the embedded controller, and send the timing cycle data to the embedded controller to set a wake-up timing cycle of the embedded controller based on the timing cycle data.

Example 2 includes the subject matter of Example 1, and wherein the power control module is to receive a command to enter the connected standby state.

Example 3 includes the subject matter of any of Examples 1 and 2, and wherein the power control module is to determine whether one or more of the electrical components has entered the low-power state.

Example 4 includes the subject matter of any of Examples 1-3, and wherein the power control module is to send a wake-up command to the embedded controller in response to a determination that the wake-up cycle has been initiated.

Example 5 includes the subject matter of any of Examples 1-4, and wherein the power control module is to receive thermal data indicative of an operating temperature of a processor of the computing device.

Example 6 includes the subject matter of any of Examples 1-5, and wherein the power control module is to determine the wake-up period for the embedded controller based on the thermal data.

Example 7 includes the subject matter of any of Examples 1-6, and wherein the power control module is to receive battery life data indicative of an amount of power available for use in a battery of the computing device.

Example 8 includes the subject matter of any of Examples 1-7, and wherein the power control module is to determine the wake-up period for the embedded controller based on the battery life data.

Example 9 includes the subject matter of any of Examples 1-8, and wherein the wake-up period defined by the timing cycle data is less than the period of the wake-up cycle initiated by the power control module.

Example 10 includes the subject matter of any of Examples 1-9, and wherein the timing cycle data sent to the embedded controller to set the wake-up timing cycle of the embedded controller causes the embedded controller to wake up more frequently than the wake-up cycle initiated by the power control module Example 11 includes the subject matter of any of Examples 1-10, and wherein the timing cycle data sent to the embedded controller to set the wake-up timing cycle of the embedded controller causes the embedded controller to wake up less frequently than the wake-up cycle initiated by the power control module.

Example 12 includes an embedded controller for managing power during a low-power state, the embedded controller comprising a wake-up management module to (i) receive a wake-up command from a power control module of a computing device, wherein the wake-up command is generated based on a wake-up cycle of the power control module, (ii) transmit, in response to the wake-up command, operation data to the power control module, wherein the operation data relates to one or more tasks to be performed by the embedded controller, (iii) receive timing cycle data from the power control module in response to the operation data, and (iv) set a wake-up timing cycle of the embedded controller based on the timing cycle data received from the power control module.

Example 13 includes the subject matter of Example 12, and further including a power state determination module to determine whether the computing device is in a connected standby state; and cause the embedded controller to enter a low-power state.

Example 14 includes the subject matter of any of Examples 12 and 13, and wherein the wake-up management module is to determine whether the embedded controller should wake-up based on an embedded controller wake-up cycle and perform one or more tasks.

Example 15 includes the subject matter of any of Examples 12-14, and wherein the wake-up management module is to measure operation data based on conditions present in the computing device; and transmit operation data to the power control module, wherein the operation data relates to one or more tasks to be performed by the embedded controller.

Example 16 includes the subject matter of any of Examples 12-15, and, wherein the wake-up management module is to transmit thermal data indicative of an operating temperature of a processor of the computing device.

Example 17 includes the subject matter of any of Examples 12-16, and wherein the wake-up management module is to transmit battery life data indicative of an amount of power available for use in a battery of the computing device.

Example 18 includes the subject matter of any of Examples 12-17, and wherein the wake-up management module is to set the wake-up timing cycle of the embedded controller to wake-up the embedded controller more frequently than the wake-up cycle of the power control module causes the embedded controller to wake-up.

Example 19 includes the subject matter of any of Examples 12-18, and wherein the wake-up management module is to set the wake-up timing cycle of the embedded controller to wake-up the embedded controller less frequently than the wake-up cycle of the power control module causes the embedded controller to wake-up.

Example 20 includes a method for managing power of components during a connected standby state, the method comprising determining, by a power control module of the computing device, whether the computing device is in a connected standby state; initiating, by the power control module, a wake-up cycle to periodically wake-up components of the computing device in response to determining that the computing device is in the connected standby state; waking-up, by the power control module and during the wake-up cycle, an embedded controller of the computing device to allow the embedded controller to perform one or more tasks; receiving, by the power control module and in response to waking-up the embedded controller, operation data from the embedded controller related to the one or more tasks to be performed by the embedded controller; generating, by the power control module, timing cycle data for the embedded controller, wherein the timing cycle data defines a wake-up period for the embedded controller; and sending the timing cycle data to the embedded controller to set a wake-up timing cycle of the embedded controller based on the timing cycle data.

Example 21 includes the subject matter of Example 20, and wherein determining whether the computing device is in the connected standby state comprises receiving, by the power control module, a command to enter the connected standby state.

Example 22 includes the subject matter of any of Examples 20 and 21, and wherein determining whether the computing device is in the connected standby state comprises determining, by the power control module, whether one or more of the components of the computing device has entered a low-power state.

Example 23 includes the subject matter of any of Examples 20-22, and wherein waking-up the embedded controller comprises sending, by the power control module, a wake-up command to the embedded controller in response to determining that the wake-up cycle has been initiated.

Example 24 includes the subject matter of any of Examples 20-23, and wherein receiving operation data from the embedded controller comprises receiving, by the power control module, thermal data indicative of an operating temperature of a processor of the computing device.

Example 25 includes the subject matter of any of Examples 20-24, and wherein generating timing cycle data comprises determining, by the power control module, the wake-up period for the embedded controller based on the thermal data.

Example 26 includes the subject matter of any of Examples 20-25, and wherein receiving operation data from the embedded controller comprises receiving, by the power control module, battery life data indicative of an amount of power available for use in a battery of the computing device.

Example 27 includes the subject matter of any of Examples 20-26, and wherein generating timing cycle data comprises determining, by the power control module, the wake-up period for the embedded controller based on the battery life data.

Example 28 includes the subject matter of any of Examples 20-27, and wherein the wake-up period defined by the timing cycle data is less than the period of the wake-up cycle initiated by the power control module.

Example 29 includes the subject matter of any of Examples 20-28, and wherein sending the timing cycle data to the embedded controller to set the wake-up timing cycle of the embedded controller causes the embedded controller to wake up more frequently than the wake-up cycle initiated by the power control module.

Example 30 includes the subject matter of any of Examples 20-29, and wherein sending the timing cycle data to the embedded controller to set the wake-up timing cycle of the embedded controller causes the embedded controller to wake up less frequently than the wake-up cycle initiated by the power control module.

Example 31 includes a method for managing power of an embedded controller during a low-power state, the method comprising receiving, by the embedded controller, a wake-up command from a power control module of the computing device, the wake-up command being generated based on a wake-up cycle of the power control module; transmitting, by the embedded controller and in response to the wake-up command, operation data to the power control module, wherein the operation data relates to one or more tasks to be performed by the embedded controller; receiving, by the embedded controller, timing cycle data from the power control module in response to the operation data; and setting, by the embedded controller, a wake-up timing cycle of the embedded controller based on the timing cycle data received from the power control module.

Example 32 includes the subject matter of Example 31, and further including determining, by the embedded controller, whether the computing device is in a connected standby state; and entering, by the embedded controller, a low-power state.

Example 33 includes the subject matter of any of Examples 31 and 32, and further including determining, by the embedded controller, whether the embedded controller should wake-up based on an embedded controller wake-up cycle and perform one or more tasks.

Example 34 includes the subject matter of any of Examples 31-33, and wherein transmitting operation data comprises measuring, by the embedded controller, operation data based on conditions present in the computing device; and transmitting, by the embedded controller, operation data to the power control module, wherein the operation data relates to one or more tasks to be performed by the embedded controller.

Example 35 includes the subject matter of any of Examples 31-34, and wherein transmitting operation data comprises transmitting, by the embedded controller, thermal data indicative of an operating temperature of a processor of the computing device.

Example 36 includes the subject matter of any of Examples 31-35, and wherein transmitting operation data comprises transmitting, by the embedded controller, battery life data indicative of an amount of power available for use in a battery of the computing device.

Example 37 includes the subject matter of any of Examples 31-36, and wherein setting the wake-up timing cycle comprises setting, by the embedded controller, the wake-up timing cycle of the embedded controller to wake-up the embedded controller more frequently than the wake-up cycle of the power control module causes the embedded controller to wake-up.

Example 38 includes the subject matter of any of Examples 31-37, and wherein setting the wake-up timing cycle of the embedded controller comprises setting, by the embedded controller, the wake-up timing cycle of the embedded controller to wake-up the embedded controller less frequently than the wake-up cycle of the power control module causes the embedded controller to wake-up.

Example 39 includes one or more machine readable storage media comprising a plurality of instructions stored thereon that in response to being executed result in a computing device performing the method of any of Examples 20-38.

Example 40 includes a computing device for managing power of components during a connected standby state, the computing device comprising means for determining whether the computing device is in a connected standby state; means for initiating a wake-up cycle to periodically wake-up components of the computing device in response to determining that the computing device is in the connected standby state; means for waking-up, during the wake-up cycle, an embedded controller of the computing device to allow the embedded controller to perform one or more tasks; means for receiving, in response to waking-up the embedded controller, operation data from the embedded controller related to the one or more tasks to be performed by the embedded controller; means for generating timing cycle data for the embedded controller, wherein the timing cycle data defines a wake-up period for the embedded controller; and means for sending the timing cycle data to the embedded controller to set a wake-up timing cycle of the embedded controller based on the timing cycle data.

Example 41 includes the subject matter of Example 40, and wherein the means for determining whether the computing device is in the connected standby state comprises means for receiving a command to enter the connected standby state.

Example 42 includes the subject matter of Example 40 and 41, and wherein the means for determining whether the computing device is in the connected standby state comprises means for determining whether one or more of the components of the computing device has entered a low-power state.

Example 43 includes the subject matter of any of Examples 40-42, and wherein the means for waking-up the embedded controller comprises means for sending a wake-up command to the embedded controller in response to determining that the wake-up cycle has been initiated.

Example 44 includes the subject matter of any of Examples 40-43, and wherein the means for receiving operation data from the embedded controller comprises means for receiving thermal data indicative of an operating temperature of a processor of the computing device.

Example 45 includes the subject matter of any of Examples 40-44, and wherein the means for generating timing cycle data comprises means for determining the wake-up period for the embedded controller based on the thermal data.

Example 46 includes the subject matter of any of Examples 40-45, and wherein the means for receiving operation data from the embedded controller comprises receiving battery life data indicative of an amount of power available for use in a battery of the computing device.

Example 47 includes the subject matter of any of Examples 40-46, and wherein the means for generating timing cycle data comprises means for determining the wake-up period for the embedded controller based on the battery life data.

Example 48 includes the subject matter of any of Examples 40-47, and wherein the wake-up period defined by the timing cycle data is less than the period of the wake-up cycle initiated by the power control module.

Example 49 includes the subject matter of any of Examples 40-48, and wherein the means for sending the timing cycle data to the embedded controller to set the wake-up timing cycle of the embedded controller causes the embedded controller to wake up more frequently than the wake-up cycle initiated by the power control module.

Example 50 includes the subject matter of any of Examples 40-49, and wherein the means for sending the timing cycle data to the embedded controller to set the wake-up timing cycle of the embedded controller causes the embedded controller to wake up less frequently than the wake-up cycle initiated by the power control module.

Example 51 includes a computing device for managing power of an embedded controller during a low-power state, the computing device comprising means for receiving a wake-up command from a power control module of the computing device, the wake-up command being generated based on a wake-up cycle of the power control module; means for transmitting, in response to the wake-up command, operation data to the power control module, wherein the operation data relates to one or more tasks to be performed by the embedded controller; means for receiving timing cycle data from the power control module in response to the operation data; and means for setting a wake-up timing cycle of the embedded controller based on the timing cycle data received from the power control module.

Example 52 includes the subject matter of Example 51, and further including means for determining whether the computing device is in a connected standby state; and means for entering a low-power state.

Example 53 includes the subject matter of any of Examples 51 and 52, and further including means for determining whether the embedded controller should wake-up based on an embedded controller wake-up cycle and perform one or more tasks.

Example 54 includes the subject matter of any of Examples 51-53, and wherein the means for transmitting operation data comprises means for measuring operation data based on conditions present in the computing device; and means for transmitting operation data to the power control module, wherein the operation data relates to one or more tasks to be performed by the embedded controller.

Example 55 includes the subject matter of any of Examples 51-54, and wherein the means for transmitting operation data comprises means for transmitting thermal data indicative of an operating temperature of a processor of the computing device.

Example 56 includes the subject matter of any of Examples 51-55, and wherein the means for transmitting operation data comprises means for transmitting battery life data indicative of an amount of power available for use in a battery of the computing device.

Example 57 includes the subject matter of any of Examples 51-56, and wherein the means for setting the wake-up timing cycle comprises means for setting the wake-up timing cycle of the embedded controller to wake-up the embedded controller more frequently than the wake-up cycle of the power control module causes the embedded controller to wake-up.

Example 58 includes the subject matter of any of Examples 51-57, and wherein the means for setting the wake-up timing cycle of the embedded controller comprises means for setting the wake-up timing cycle of the embedded controller to wake-up the embedded controller less frequently than the wake-up cycle of the power control module causes the embedded controller to wake-up.

The invention claimed is:

1. A computing device for managing power during a connected standby state, the computing device comprising:
one or more electrical components to enter a low-power state;

an embedded controller to perform one or more tasks of the computing device; and a power control module to:
determine whether the computing device is in a connected standby state, initiate a wake-up cycle to periodically wake-up the one or more electrical components of the computing device in response to a determination that the computing device is in the connected standby state, wake-up the embedded controller to allow the embedded controller to perform the one or more tasks, receive, in response to the wake-up of the embedded controller, operation data from the embedded controller related to the one or more tasks to be performed by the embedded controller, generate timing cycle data for the embedded controller, wherein the timing cycle data defines a wake-up period for the embedded controller, and send the timing cycle data to the embedded controller to set a wake-up timing cycle of the embedded controller based on the timing cycle data.

2. The computing device of claim 1, wherein the power control module is to send a wake-up command to the embedded controller in response to a determination that the wake-up cycle has been initiated.

3. The computing device of claim 1, wherein the power control module is to receive thermal data indicative of an operating temperature of a processor of the computing device.

4. The computing device of claim 3, wherein the power control module is to determine the wake-up period for the embedded controller based on the thermal data.

5. The computing device of claim 1, wherein the power control module is to receive battery life data indicative of an amount of power available for use in a battery of the computing device.

6. The computing device of claim 5, wherein the power control module is to determine the wake-up period for the embedded controller based on the battery life data.

7. The computing device of claim 1, wherein the wake-up period defined by the timing cycle data is less than the period of the wake-up cycle initiated by the power control module.

8. A method for managing power of components during a connected standby state, the method comprising:

determining, by a power control module of a computing device, whether the computing device is in a connected standby state;

initiating, by the power control module, a first wake-up timing cycle to periodically wake-up components of the computing device in response to determining that the computing device is in the connected standby state;

waking-up, by the power control module and during the first wake-up timing cycle, an embedded controller of the computing device to allow the embedded controller to perform one or more tasks;

receiving, by the power control module and in response to waking-up the embedded controller, operation data from the embedded controller related to the one or more tasks to be performed by the embedded controller;

generating, by the power control module, timing cycle data for the embedded controller, wherein the timing cycle data defines a wake-up period for the embedded controller;

sending the timing cycle data to the embedded controller to set a second wake-up timing cycle of the embedded controller based on the timing cycle data; and setting, by the embedded controller, the second wake-up timing cycle for the embedded controller different from the first wake-up timing cycle based on the timing cycle data received from the power control module.

9. The method of claim 8, wherein waking-up the embedded controller comprises sending, by the power control module, a wake-up command to the embedded controller in response to determining that the first wake-up timing cycle has been initiated.

10. The method of claim 8, wherein receiving operation data from the embedded controller comprises receiving, by the power control module, thermal data indicative of an operating temperature of a processor of the computing device.

11. The method of claim 10, wherein generating timing cycle data comprises determining, by the power control module, the wake-up period for the embedded controller based on the thermal data.

12. The method of claim 8, wherein receiving operation data from the embedded controller comprises receiving, by the power control module, battery life data indicative of an amount of power available for use in a battery of the computing device.

13. The method of claim 12, wherein generating timing cycle data comprises determining, by the power control module, the wake-up period for the embedded controller based on the battery life data.

14. The method of claim 8, wherein the wake-up period defined by the timing cycle data is less than the period of the first wake-up timing cycle initiated by the power control module.

15. One or more non-transitory computer-readable storage media comprising a plurality of instructions that in response to being executed cause a computing device to:

determine whether the computing device is in a connected standby state;

initiate a wake-up cycle to periodically wake-up components of the computing device in response to determining that the computing device is in the connected standby state;

wake-up, during the wake-up cycle, an embedded controller of the computing device to allow the embedded controller to perform one or more tasks;

receive, in response to waking-up the embedded controller, operation data from the embedded controller related to the one or more tasks to be performed by the embedded controller;

generate timing cycle data for the embedded controller, wherein the timing cycle data defines a wake-up period for the embedded controller; and send the timing cycle data to the embedded controller to set a wake-up timing cycle of the embedded controller based on the timing cycle data.

16. The one or more non-transitory computer-readable storage media of claim 15, wherein to wake-up the embedded controller comprises to send a wake-up command to the embedded controller in response to determining that the wake-up cycle has been initiated.

17. The one or more non-transitory computer-readable storage media of claim 15, wherein to receive operation data from the embedded controller comprises to receive thermal data indicative of an operating temperature of a processor of the computing device.

18. The one or more non-transitory computer-readable storage media of claim 17, wherein to generate timing cycle data comprises to determine the wake-up period for the embedded controller based on the thermal data.

19. The one or more non-transitory computer-readable storage media of claim 15, wherein to receive operation data from the embedded controller comprises to receive battery life data indicative of an amount of power available for use in a battery of the computing device.

20. The one or more non-transitory computer-readable storage media of claim 19, wherein to generate timing cycle data comprises to determine the wake-up period for the embedded controller based on the battery life data.

21. The one or more non-transitory computer-readable storage media of claim 15, wherein the wake-up period defined by the timing cycle data is less than the period of the wake-up cycle initiated by the power control module.

22. A method for managing power of an embedded controller of a computing device during a low-power state, the method comprising:
  receiving, by the embedded controller, a wake-up command from a power control module of the computing device, the wake-up command being generated based on a wake-up cycle of the power control module;
  transmitting, by the embedded controller and in response to the wake-up command, operation data to the power control module, wherein the operation data relates to one or more tasks to be performed by the embedded controller;
  receiving, by the embedded controller, timing cycle data from the power control module in response to the operation data; and
  setting, by the embedded controller, a wake-up timing cycle of the embedded controller based on the timing cycle data received from the power control module.

23. The method of claim 22, wherein transmitting operation data comprises transmitting, by the embedded controller, thermal data indicative of an operating temperature of a processor of the computing device.

24. The method of claim 22, wherein transmitting operation data comprises transmitting, by the embedded controller, battery life data indicative of an amount of power available for use in a battery of the computing device.

25. The method of claim 22, wherein a period of the wake-up cycle of the power control module is different from a period of the wake-up timing cycle of the embedded controller.

* * * * *